US010277459B2

(12) United States Patent
Chakra et al.

(10) Patent No.: US 10,277,459 B2
(45) Date of Patent: Apr. 30, 2019

(54) USER GUIDANCE DATA FOR ESTABLISHING A DESIRED END-STATE CONFIGURATION

(71) Applicant: International Business Machines Corporation, Armonk, NY (US)

(72) Inventors: Al Chakra, Apex, NC (US); Liam Harpur, Dublin (IE); Sumit Patel, Irving, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 15/088,613

(22) Filed: Apr. 1, 2016

(65) Prior Publication Data

US 2017/0288963 A1 Oct. 5, 2017

(51) Int. Cl.
*H04L 12/24* (2006.01)
*H04L 29/08* (2006.01)

(52) U.S. Cl.
CPC ...... *H04L 41/0806* (2013.01); *H04L 41/0883* (2013.01); *H04L 41/0886* (2013.01); *H04L 41/22* (2013.01); *H04L 67/306* (2013.01)

(58) Field of Classification Search
CPC . H04L 41/0806; H04L 41/0883; H04L 41/22; H04L 67/306
See application file for complete search history.

(56) References Cited

U.S. PATENT DOCUMENTS

| | | | | |
|---|---|---|---|---|
| 2007/0277104 A1* | 11/2007 | Hennum | ............... | G06F 9/4446 715/705 |
| 2008/0288865 A1* | 11/2008 | Raffel | .................. | G06F 9/4446 715/709 |
| 2009/0089751 A1* | 4/2009 | Raikes | ................. | G06F 9/4446 717/120 |
| 2009/0119610 A1* | 5/2009 | Raffel | .................. | G06F 9/4446 715/771 |
| 2009/0199097 A1* | 8/2009 | Black | .................... | G06F 9/4446 715/708 |
| 2014/0237304 A1 | 8/2014 | Lai et al. | | |
| 2014/0379398 A1 | 12/2014 | Agrawal | | |

OTHER PUBLICATIONS

Al Chakra, et al., "User Guidance Data for Establishing a Desired End-State Configuration", U.S. Appl. No. 15/290,243, filed Oct. 11, 2016.

(Continued)

*Primary Examiner* — Larry D Donaghue
(74) *Attorney, Agent, or Firm* — Cantor Colburn LLP; Teddi Maranzano (57) ABSTRACT

Disclosed herein are systems, methods, and computer-readable media for generating and presenting, to an end user, user guidance data for achieving a desired end-state device or application configuration. End-state configuration source data may be provided to an application component. The application component may determine a desired end-state configuration from the source data, and may further determine a navigation path for transitioning from a current configuration state to the desired end-state configuration. The application component may then generate user guidance data to guide the user through the navigation path.

13 Claims, 5 Drawing Sheets

(56) References Cited

OTHER PUBLICATIONS

List of IBM Patents or Patent Applications Treated as Related; (Appendix P), Filed Dec. 5, 2016; 2 pages.
"Image Analyzer" Downloaded Apr. 1, 2016; http://www.image-analyzer.com/technology.aspx; 2 pages.
"Optical Character Recognition," dated Jul. 29, 2002: http://www.computerworld.com/article/2577868/app-development/optical-character-recognition.html; 5 pages.
Redhat, "Managing Configuration Drift", https://access.redhat.com/documentation/en-US/JBoss_Operations_Netwo . . . , 2015, 8 pages.

* cited by examiner

FIG. 5

USER GUIDANCE DATA FOR ESTABLISHING A DESIRED END-STATE CONFIGURATION

BACKGROUND

Spurred on by the ubiquity of mobile devices, the increasing availability of network connectivity, and the incorporation of more advanced network-based technology into a variety of types of devices (e.g., thermostats, televisions, household appliances, etc.), individuals are increasingly relying on a multitude of different devices and applications running on such devices to perform an ever-increasing number of work-related and personal tasks. As these devices and their applications continue to provide more enhanced functionality, the number and available combinations of settings, preferences, user configuration options, or the like also expands. Some users, particularly those who may not be as tech-savvy, may struggle with establishing even basic device configurations and settings, which may be further compounded as device and application functionality is enhanced and the configuration options available to users grow. Conventional practice has been for users to consult tutorials (e.g., "how-to" guides, videos, etc.) or the like to determine how to achieve a desired setting or configuration. This conventional practice suffers from a number of drawbacks, technical solutions to which are described herein.

SUMMARY

In one or more example embodiments of the disclosure, a method is disclosed that includes receiving, from an end user, input data; parsing the input data to obtain parsed data, the parsed data indicating a desired end-state configuration of an application; determining, based at least in part on the parsed data, a set of one or more intermediate configuration states between a current configuration state of the application and the desired end-state configuration; generating user guidance data based at least in part on the current configuration state, the set of one or more intermediate configuration states, and the desired end-state configuration; and presenting the user guidance data to the end user.

In one or more other example embodiments of the disclosure, a system is disclosed that includes at least one memory storing computer-executable instructions; and at least one processor configured to access at least one memory and execute the computer-executable instructions to: receive, from an end user, input data; parse the input data to obtain parsed data, the parsed data indicating a desired end-state configuration of an application; determine, based at least in part on the parsed data, a set of one or more intermediate configuration states between a current configuration state of the application and the desired end-state configuration; generate user guidance data based at least in part on the current configuration state, the set of one or more intermediate configuration states, and the desired end-state configuration; and present the user guidance data to the end user.

In one or more other example embodiments of the disclosure, a computer program product is disclosed that comprises a non-transitory storage medium readable by a processing circuit, the storage medium storing instructions executable by the processing circuit to cause a method to be performed. The method includes receiving, from an end user, input data; parsing the input data to obtain parsed data, the parsed data indicating a desired end-state configuration of an application; determining, based at least in part on the parsed data, a set of one or more intermediate configuration states between a current configuration state of the application and the desired end-state configuration; generating user guidance data based at least in part on the current configuration state, the set of one or more intermediate configuration states, and the desired end-state configuration; and presenting the user guidance data to the end user.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Disclosed herein are systems, methods, and computer-readable media for generating and presenting user guidance data to an end user in order to enable establishment of a desired end-state configuration of a device or an application. The desired end-state configuration may be a device-level configuration, a device-level setting, an application-level configuration, an application-level setting, or the like. As used herein, the term configuration may refer to a collection of one or more device or application settings.

In conventional practice, users who seek to configure a device or an application to have a desired configuration, but who are unaware of the series of steps necessary to achieve that desired configuration, may perform an online search or otherwise attempt to access tutorials or product documentation that provides an indication of the steps to be taken to obtain the desired configuration. Such tutorials may take the form of text-based instructions, video tutorials, an image representative of the desired configuration, or combinations thereof.

Tutorials and product documentation, however, suffer from a number of drawbacks. For example, a user may access an image that depicts an application window having various settings/features selected and/or unselected that together constitute a particular device or application configuration. However, such an image that depicts only an end-state configuration provides no guidance to the user as to how to arrive at that end-state configuration from a current device or application configuration associated with the user's device. As another example, video tutorials or text-based instructions for achieving a desired configuration typically assume a particular starting configuration that may not correspond to the current configuration of a user's device, and thus, may not be effective in guiding the user from the current configuration to the desired end-state configuration. Yet another example drawback associated with a tutorial is that it generally corresponds to a particular version of an application or operating system (OS) or a particular device model, and thus, does not account for potential differences in the steps required to achieve a desired configuration between different device models or application or OS versions. Still another example drawback is that a user typically has to switch back and forth between a tutorial and the application being configured, which degrades the customer experience and may lead to configuration errors.

Because of the aforementioned drawbacks, users may be reluctant to turn to such tutorials for guidance. This reluctance may be further exacerbated as device/application functionality and capabilities are enhanced and establishing a desired configuration is perceived as becoming increasingly more complex. As a result, users may turn to devices or applications that they view as being simpler to operate and configure or may seek the assistance of technical support with greater frequency. This increased utilization of customer support may, in turn, create a greater cost burden on the manufacturer of a device or the developer of an application. Thus, it is desirable to limit the frequency with which users need to seek technical assistance, particularly in those scenarios in which the desired configuration is relatively simple to establish (e.g., changing the ringtone on a smartphone).

Example embodiments of the disclosure include systems, methods, and computer-readable media that provide technical solutions to at least some of the aforementioned drawbacks by generating and presenting user guidance data to an end user that facilitates the establishment of a desired end-state configuration of a device or an application. While example embodiments may be described herein in connection with configuring an application to have a desired end-state configuration, it should be appreciated that such example embodiments are also applicable to desired end-state device-level configurations.

The process for generating the user guidance data may be initiated by an end user providing end-state configuration source data to an application component. The end-state configuration source data may relate to an application that the end user wishes to configure and may include one or more images, video content, text file(s), or the like. In certain example embodiments, the end-state configuration source data may be an image such as a screenshot of an application window that indicates a collection of setting(s) representative of the desired end-state configuration. In other example embodiments, the end-state configuration source data may include a series of images or image frames of a video that identify a series of application windows representing different configuration states. In yet other example embodiments, the end-state configuration source data may include text instructions, a JavaScript Object Notation (JSON) map, or the like.

The end-state configuration source data may be provided to the application component in any of a variety of ways. For example, the end-state configuration source data may be uploaded to the application component via a drag-and-drop mechanism or via any other suitable upload mechanism. In certain example embodiments, a screenshot of an application window representing a desired end-state configuration may be generated and dragged onto a user interface (UI) of the application component. As another example, a screenshot of a video frame may be captured and provided to the application component. As yet another example, existing text-based instructions for establishing a desired end-state configuration (e.g., help documentation) may be selected (e.g., highlighted) or text may be generated and dragged onto or otherwise uploaded to the application component.

The application component may be a standalone application or may be implemented as a plugin, extension, applet, or the like of the application that the end user wishes to configure. Upon receiving the end-state configuration source data, the application component may initiate an investigation phase to parse the end-state configuration source data and match the source data to existing content within the application to be configured. Parsing the source data may result in parsed data that includes an indication of the desired end-state configuration. Parsing the source data may include determining a data source from which the source data was obtained, retrieved, or the like. In those example embodiments in which the source data includes a series of images, parsing the source data may include determining an order for the series of images that represents a progression through a series of intermediate configuration states. Parsing the source data may also include scrubbing any image(s), video, and/or text from the source data that includes sensitive matter or that is not common across some aggregate number of users. Parsing the source data may additionally or alternatively include identifying metadata associated with the source data. For example, metadata associated with an image (e.g., a screenshot) may be identified. The metadata may include, for example, information indicating an application version, OS version, or the like associated with an application corresponding to an application window captured in the image.

One or more context matching operations may be performed on the parsed data to match portions of the parsed data to applicable content of the application to be configured. For example, an optical character recognition (OCR) technique may be used to match each image in the parsed source data to corresponding content (e.g., a corresponding application window) of the application. A statistical threshold value may be used to determine candidate content that matches a particular image in the parsed source data. For example, content that includes text that matches, at least, a threshold amount of text of an image in the parsed source data may be considered a candidate match. The candidate content (e.g., application window) having the highest amount of matching text may then be selected as the matching content for the image. A unique identifier may be used to identify content (e.g., an application window) corresponding to a particular image or portion of the parsed data. In certain example embodiments, metadata identified by parsing the source data may be used to identify the appropriate application version and/or the appropriate application window that corresponds to a portion of the parsed source data.

In certain example embodiments, such as those in which the end-state configuration source data includes a single image (e.g., a screenshot of a desired end-state configuration), once the context matching has been performed to determine application content (e.g., an application window) that corresponds to the end-state configuration, a hierarchal tree or other data construct that includes a plurality of navigation paths may be accessed to determine a navigation path for achieving the desired end-state configuration. More specifically, the hierarchal data structure may include a set of navigation paths, where each navigation path indicates a set of one or more intermediate application windows and an order in which the windows are accessed to transition from an initial application window representative of a starting configuration state to a final application window representative of an end-state configuration. The set of one or more intermediate application windows may be representative of one or more intermediate configuration states. The hierarchal data structure may include a respective navigation path for each pair of application windows representative of different configuration states. It should be appreciated that in certain example embodiments an application window that includes a selected setting may be considered a different application window from an application window in which the setting is unselected, even in those cases in which all other content is the same between the two application windows. In contrast, an application window in which various settings may be selected or unselected may be considered a single application window regardless of which combination of settings may be selected or unselected. However, in such scenarios, each combination of selected/unselected settings may be deemed a distinct configuration state.

The application component may determine a current configuration state of an application and locate the navigation path in the hierarchal tree that represents the appropriate path for transitioning from the current configuration state to the desired end-state configuration. In those example embodiments in which the parsed data includes multiple, ordered images and context matching has been performed to map the images to corresponding application content (e.g., corresponding application windows), the appropriate navigation path may be one that includes an initial application window that corresponds to the current configuration state of the application, a final application window that has been mapped to the image representing the end-state configuration, and a set of intermediate application window(s) that include those application window(s) that have been mapped to the remaining images in the parsed data.

After the application component has determined a navigation path for transitioning from a current configuration state of an application to a desired end-state configuration, the application component may generate corresponding user guidance data. The application component may then initiate presentation of the user guidance data to the end user in any suitable form. The user guidance data may be, for example, a series of slides that may include images, text, or the like that guide the end user through the process of transitioning from the current configuration state of the application to the desired end-state configuration. As another example, the user guidance data may include verbal and/or visual cues that sequentially direct the end user to appropriate areas in the application to make the necessary modifications to various settings to achieve the desired end-state configuration. For example, a verbal and/or a visual cue may indicate the next application window to open, the next setting to select/deselect, and so forth.

In certain example embodiments, the user guidance data may be modified based on the particular application version that is installed on a user device, based on the particular OS version installed on the user device, and/or based on a device model of the user device. For example, images, text, verbal and/or visual cues, or the like in the user guidance data may be modified to reflect differences in application window content and/or the order in which application windows are accessed across different application versions, OS versions, device models, or the like. It should be appreciated that differences in application versions, OS versions, device models, or the like may additionally or alternatively be accounted for when selecting the navigation path. For example, different navigation paths may be provided for transitioning between a particular starting configuration and a particular end configuration for each of multiple application versions, OS versions, or device models. The application component may determine the version of the application being used, the OS version, and/or the device model of the user device, and select, based thereon, the corresponding navigation path for transitioning from the current configuration to the desired end-state configuration.

In certain example embodiments, the user guidance data may be modified over time for a particular user profile. More specifically, historical user guidance data may be stored indicating the nature of the user guidance previously presented to a user (e.g., the number and/or type of cues presented), the number of instances such user guidance was presented to the user, and so forth. When a new request is received indicating a desired end-state configuration, the application component may access the historical user guidance data to determine whether user guidance data was previously presented to the same user profile to achieve the same desired end-state configuration, and if so, the nature of such user guidance. If, for example, user guidance for achieving the same end-state configuration that is currently desired was previously presented at least a threshold number of times, the current user guidance data may be modified based on an assumption that the end user possesses some prior knowledge as to how to achieve the desired end-state configuration. For example, verbal and/or visual cues previously presented for achieving the desired end-state configuration may be modified to arrows or other simpler prompts directing the end user through the intermediate application windows specified by the selected navigation path.

In certain example embodiments, presenting the user guidance data may include causing an automatic transition from a particular configuration state to a next configuration state. For example, rather than guiding the end user to perform a particular change that causes a transition to occur from a particular configuration state to a next configuration state, the application component may automatically perform the change. An automatic transition may be performed between any number of configuration states. For example, an automatic transition may be performed between the current configuration state of an application to an intermediate configuration state, between two intermediate configuration states, and/or between an intermediate configuration state and the desired end-state configuration.

Illustrative Systems, Methods, and Computer-Readable Media

Figure 1:
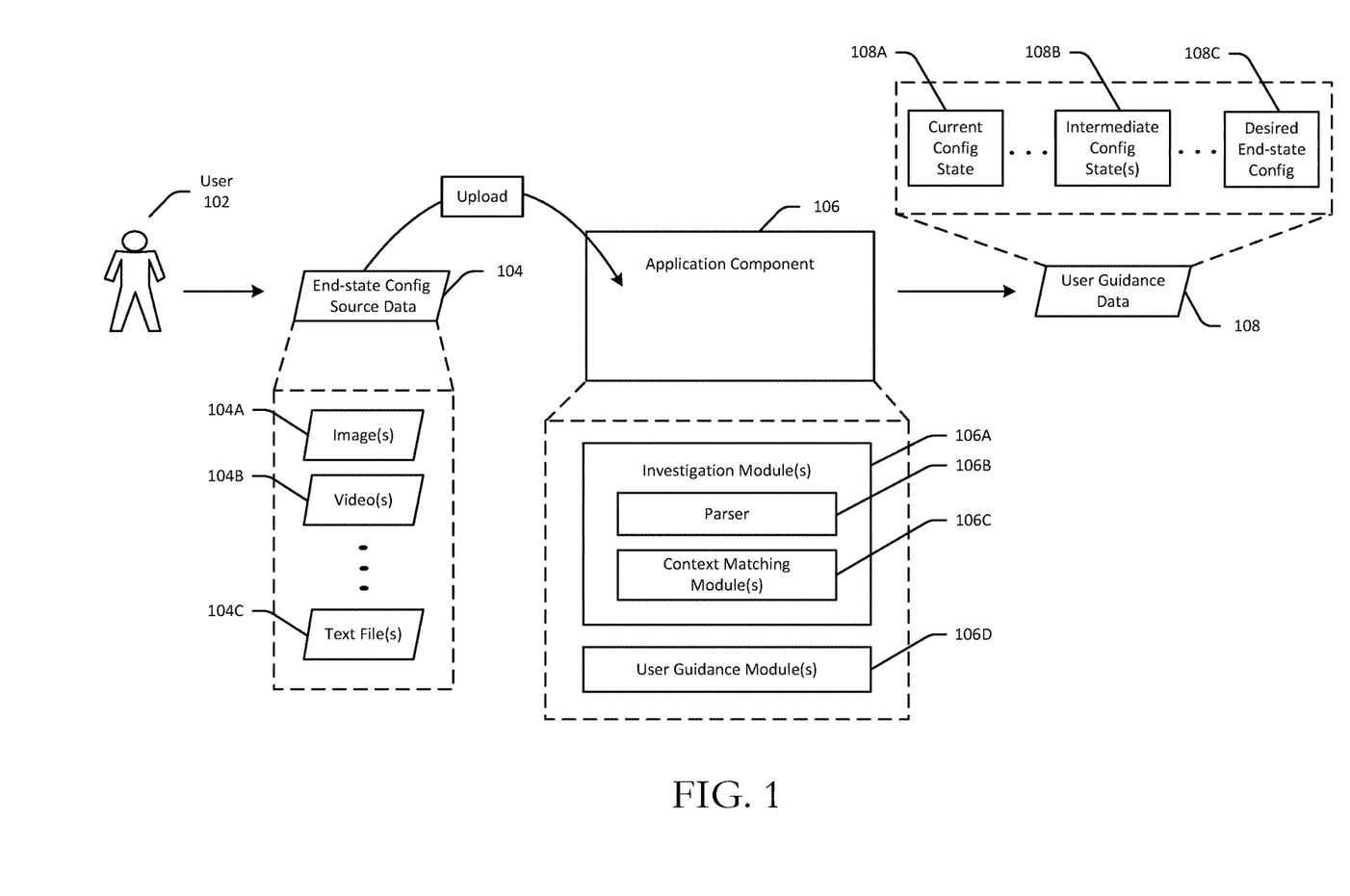
FIG. 1 schematically depicts an illustrative set of operations for determining and presenting, to an end user, user guidance data that enables establishing a desired end-state configuration in accordance with one or more example embodiments of the disclosure.
Figure 2:
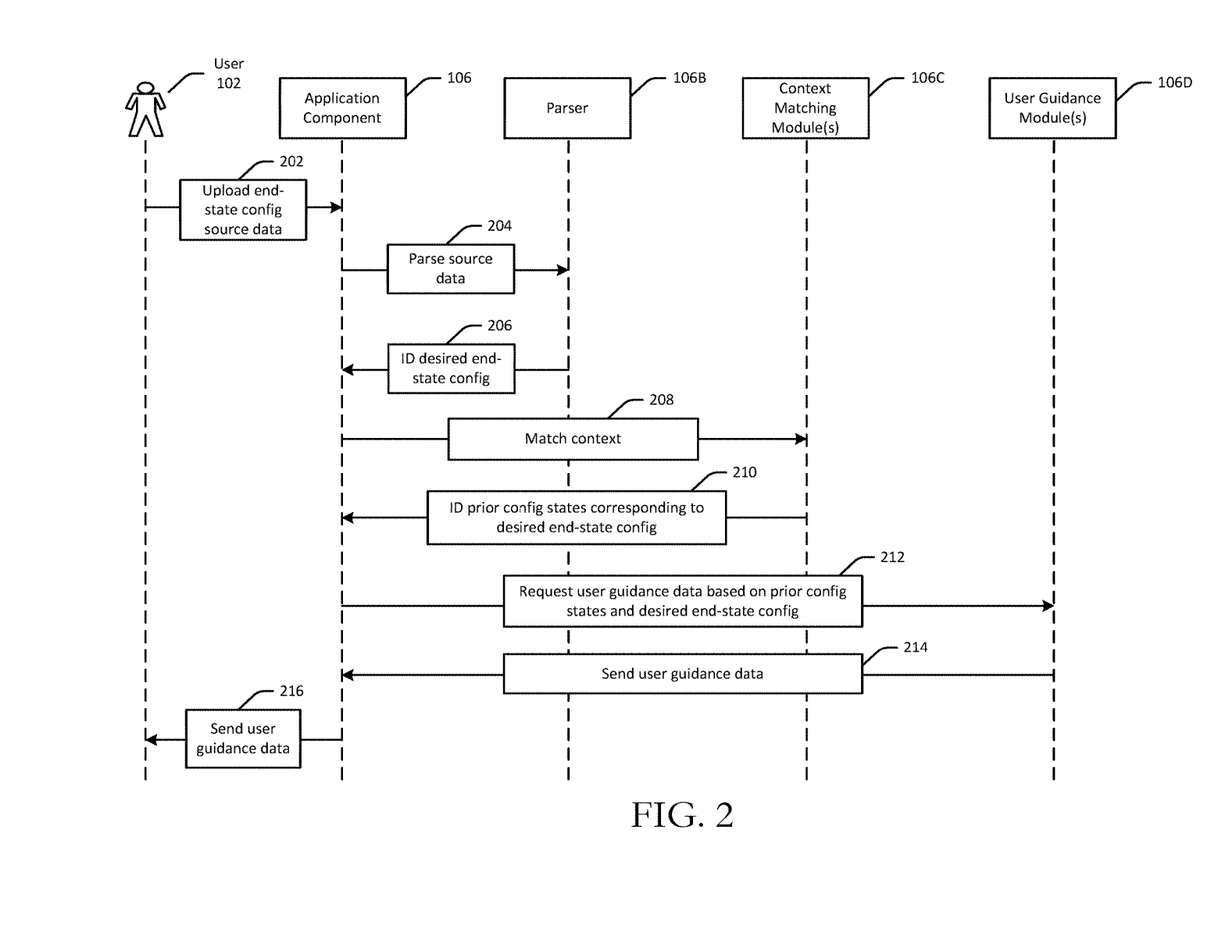
FIG. 2 is a data flow diagram of an illustrative set of operations for determining and presenting, to an end user, user guidance data that enables establishing a desired end-state configuration in accordance with one or more example embodiments of the disclosure.

FIG. 1 schematically depicts an illustrative set of operations for determining user guidance data for achieving a desired end-state configuration of an application from a current configuration state of the application in accordance with one or more example embodiments of the disclosure. FIG. 2 is a data flow diagram of an illustrative set of operations for determining user guidance data for achieving a desired end-state configuration of an application from a current configuration state of the application in accordance with one or more example embodiments of the disclosure.

Referring to FIGS. 1 and 2 in conjunction with one another, the process for generating user guidance data 108 may be initiated by an end user 102 uploading 202 or otherwise providing end-state configuration source data 104 to an application component 106. The end-state configuration source data 104 may relate to an application that the end user 102 wishes to configure and may include one or more images 104A, video content 104B, text file(s) 104C, or the like. For example, the end-state configuration source data 104 may include an image 104A such as a screenshot of an application window that indicates a collection of setting(s) representative of a desired end-state configuration 108C. As a more specific example, the image 104A may be a screenshot of a properly configured out of office reminder preferences window. The screenshot may be captured from help documentation, a video, a foreground application window, or the like. In other example embodiments, the end-state configuration source data 104 may include a series of images 104A or image frames of a video 104B that identify a series of application windows representing different configuration states. In yet other example embodiments, the end-state configuration source data 104 may include text data 104C such as, for example, text instructions, a JSON map, or the like.

The end-state configuration source data 104 may be provided to the application component 106 in any of a variety of ways. For example, the end-state configuration source data 104 may be uploaded 202 to the application component 106 via a drag-and-drop mechanism or via any other suitable upload mechanism. In certain example embodiments, a screenshot of an application window representing the desired end-state configuration 108C may be generated and dragged onto a UI of the application component 106. As another example, a screenshot of a video frame may be captured and provided to the application component 106. As yet another example, existing text-based instructions for establishing the desired end-state configuration 108C (e.g., help documentation) may be selected (e.g., highlighted) or text may be generated and dragged onto or otherwise uploaded to the application component 106.

The application component 106 may be a standalone application or may be implemented as a plugin, extension, applet, or the like of the application that the end user 102 wishes to configure. The application component 106 may include various modules and sub-modules, where each such module or sub-module may include computer-readable/computer-executable code (e.g., computer-executable instructions) configured to be executed by one or more processing units to perform various particular operations.

For example, the application component 106 may include one or more investigation modules 106A which may, in turn, include various sub-modules such as, for example, a parser 106B and one or more context matching modules 106C. The application component 106 may further include one or more user guidance modules 106D. Upon receiving the end-state configuration source data 104, the application component 106 may initiate an investigation phase to parse 204 the end-state configuration source data 104. In particular, computer-executable instructions of the parser 106B may be executed to cause the source data 104 to be parsed. Parsing the source data may result in parsed data that includes an indication of the desired end-state configuration 108C. The parser 106B may provide 206 the parsed data including the indication of the desired end-state configuration 108C to the application component 106. In those example embodiments in which the source data 104 includes a series of images 104A, parsing the source data 104 may include determining an order for the series of images 104A that represents a progression through a series of intermediate configuration states. Parsing the source data 104 may also include scrubbing any image(s), video, and/or text from the source data 104 that includes sensitive matter or that is not common across some aggregate number of users. Parsing the source data 104 may additionally or alternatively include identifying metadata associated with the source data 104. For example, metadata associated with an image 104A (e.g., a screenshot) may be identified. The metadata may include, for example, information indicating an application version, OS version, or the like associated with an application corresponding to an application window captured in the image 104A.

One or more context matching operations may be performed on the parsed data to match portions of the parsed data to applicable content of the application to be configured. More specifically, the application component 106 may send a request 208 or otherwise instruct the context matching module(s) 106C to perform context matching operations to match the parsed data to application content (e.g., application window(s)) of the application, and as a result, identify prior (e.g., intermediate) configuration states 108B corresponding to the desired end-state configuration 108C.

The context matching operations performed by the context matching module(s) 106C may include, for example, performing OCR processing to match each image in the parsed source data to corresponding content (e.g., a corresponding application window) of the application. A statistical threshold value may be used to determine candidate content that matches a particular image in the parsed source data. For example, content that includes text that matches, at least, a threshold amount of text of an image in the parsed source data may be considered a candidate match. The candidate content (e.g., application window) having the highest amount of matching text may then be selected as the matching content for the image. A unique identifier may be used to identify content (e.g., an application window) corresponding to a particular image or portion of the parsed data. In certain example embodiments, metadata identified by parsing the source data may be used to identify the appropriate application version and/or the appropriate application window that corresponds to a portion of the parsed source data.

In certain example embodiments, such as those in which the end-state configuration source data 104 includes a single image 104A (e.g., a screenshot of a desired end-state configuration), once the context matching module(s) have performed a context matching operation to determine application content (e.g., an application window) that corresponds to the end-state configuration 108C, the context matching module(s) 106C, or more generally, the investigation module(s) 106A may access a hierarchal tree or other data construct that includes a plurality of navigation paths in order to determine a navigation path for achieving the desired end-state configuration 108C. More specifically, the hierarchal data structure may include a set of navigation paths, where each navigation path indicates a set of one or more intermediate application windows and an order in which the windows are accessed to transition from an initial application window representative of a starting configuration state to a final application window representative of an end-state configuration. The hierarchal data structure may include a respective navigation path for each pair of application windows representative of different configuration states.

The set of one or more intermediate application windows may be representative of one or more intermediate configuration states. The number of intermediate configuration states represented by the intermediate application windows may be greater than the number of intermediate application windows if, for example, different combinations of settings are selected/unselected on a single application window in order to transition between different intermediate configuration states as part of traversing the navigation path.

The context matching module(s) 106C may be additionally configured to determine a current configuration state 108A of an application and locate the navigation path in the hierarchal tree that represents the appropriate path for transitioning from the current configuration state 108A to the desired end-state configuration 108C by traversing through one or more intermediate configuration states 108B. In those example embodiments in which the parsed data includes multiple, ordered images and context matching has been performed to map the images to corresponding application content (e.g., corresponding application windows), the appropriate navigation path may be one that includes an initial application window that corresponds to the current configuration state 108A of the application, a final application window that has been mapped to the image representing the end-state configuration 108C, and a set of intermediate application window(s) that include those application window(s) that have been mapped to the remaining images in the parsed data.

In an example scenario, an image screenshot may be imported to the application component 106 via, for example, a Java applet. Upon receiving the image, the content matching module(s) 106C may perform context matching operations, which may utilize OCR or other optical recognition/image recognition technologies, to determine an application window in the target application to which the image relates. For example, the context matching module(s) 106C may determine that the image is of the "Accounts" tab of Application A having a particular combination of settings selected. Having determined the application window associated with the desired end-state configuration 108C, the application component 106 may then compare that end-state configuration 108C to the current configuration state 106A and determine the navigation path for transitioning from the current configuration state 106A to the end-state configuration 108C. The navigation path may be, for example, Application A→click Preferences tab→click Accounts tab→make one or more settings selections. The application component 106 may utilize metadata associated with the image to determine the application or OS version or device model and select the corresponding navigation path.

After the context matching module(s) 106C are executed to determine a navigation path for transitioning from the current configuration state 108A of an application to the desired end-state configuration 108C, the context matching module(s) 106C may provide 210 an indication of the selected navigation path to the application component 106 which may, in turn, send a request 212 to the user guidance module(s) 106D to generate corresponding user guidance data 108 based at least in part on the selected navigation path.

Upon generating the user guidance data 108, the user guidance module(s) 106D may send 214 the user guidance data 108 to the application component 106 which may, in turn, initiate presentation 216 of the user guidance data 108 to the end user 102 in any suitable form. The user guidance data 108 may be, for example, a series of slides that may include images, text, or the like that guide the end user 102 through the process of transitioning from the current configuration state 108A of the application to the desired end-state configuration 108C. As another example, the user guidance data 108 may include verbal and/or visual cues that sequentially direct the end user 102 to appropriate areas in the application to make the necessary modifications to various settings to achieve the desired end-state configuration 108C.

In certain example embodiments, the user guidance data 108 may prohibit the user from transitioning between application windows if the user action(s) performed (e.g., selecting or deselecting a setting, enter free-form input, etc.) do not match those specified by the navigation path. An error message may be presented to the end user if the user makes a selection or settings change that is not consistent with the navigation path for achieving the desired end-state configuration. Different or additional cues, prompts, or the like may be presented the end user to inform the user of the error and the measures to take the correct error. Data indicative of such human error may be stored, and may be used to determine the type of user guidance to generate for a particular user. For example, such data may be used to tailor the user guidance data to the technological sophistication level of the user. For example, user guidance data for a user who tends to make more mistakes when performing a configuration change may include simpler cues or prompts, automate more transitions, refrain from omitting any cues or prompts that would not be included for more tech-savvy users, or the like.

In certain example embodiments, the user guidance data 108 may be modified based on the particular application version that is installed on a user device, based on the particular OS version installed on the user device, and/or based on a model of the user device. For example, images, text, verbal and/or visual cues, or the like in the user guidance data 108 may be modified to reflect differences in application window content and/or the order in which application windows are accessed across different application versions, OS versions, device models, or the like. It should be appreciated that differences in application versions, OS versions, device models, or the like may additionally or alternatively be accounted for when selecting the navigation path. For example, different navigation paths may be provided for transitioning between a particular starting configuration and a particular end configuration for each of multiple application versions, OS versions, or device models. The application component 106 may determine the version of the application being used, the OS version, and/or the model of the user device, and select the corresponding navigation path for transitioning from the current configuration state 108A to the desired end-state configuration 108C based thereon. Further, in certain example embodiments, the user guidance data 108 may be cross-referenced with online logs, tutorials, product documentation, or the like to determine if the user guidance data 108 should be updated to reflect more recent/improved methods for achieving the desired end-state configuration 108C.

In certain example embodiments, presenting the user guidance data 108 may include causing an automatic transition from a particular configuration state to a next configuration state. For example, rather than guiding the end user 102 to perform a particular change that causes a transition to occur from a particular configuration state to a next configuration state, the application component 106 may automatically perform the change. An automatic transition may be performed between any number of configuration states. For example, an automatic transition may be performed between the current configuration state 108A of an application to an intermediate configuration state 108B, between two intermediate configuration states 108B, and/or between an intermediate configuration state 108B and the desired end-state configuration 108C.

Example embodiments of the disclosure are applicable to any number of scenarios. In an example scenario, an end user may wish to configure his/her laptop to automatically access a secured wireless network. Configuring a computer to automatically access a secured wireless network typically involves a number of steps and decision points relating to the type of encryption, the network name, specific security settings, or the like. In this example scenario, the end user could capture a screenshot of an application window depicting a combination of settings representing the desired end-state configuration (e.g., a configuration that allows the user's laptop to automatically access a secured wireless network). The end user could then upload (e.g., drag-and-drop) the screenshot to a networking utility having the application component functionality described earlier. The application component can then determine the navigation path for transitioning from the current configuration state to the desired end-state configuration and generate user guidance data based thereon. The user guidance data may be presented to the end user as verbal and/or on-screen cues that direct the end user through the series of actions necessary to establish the end-state configuration associated with automatically accessing a secured wireless network. The cues may include directing the end user where to click, which option to select from a drop-down menu, where/when to enter the network name, and so forth.

Example embodiments of the disclosure may also be used to troubleshoot a problem and generate and present user guidance data to eliminate the problem and establish a proper functioning end-state configuration. In an example scenario, an uploaded image may include embedded content (e.g. a metadata tag). The embedded content may include, for example, a link to a database, a uniform resource locator (URL), or the like. The application component may test these links on the target application to determine if network access issues are present. For example, if the end user is unable to access a Java database, the application component may ping the Java database in the background and troubleshoot why the target application is having network access issues. Upon determining the cause of the network access issues, user guidance data 108 may be generated that guides the end user through the series of steps necessary to correct the network access problem and achieve the desired end-state configuration. In another example scenario, the application component may determine whether there is a mismatch between the version of the target application and the version of the OS. In certain example embodiments, the application component may calculate the risk of mismatched versions by comparing and contrasting available data sources.

Example embodiments of the disclosure include or yield various technical features, technical effects, and/or improvements to technology. Example embodiments of the disclosure provide methods, systems, and computer-readable media for receiving end-state configuration source data, parsing the source data to determine a desired end-state configuration, performing context matching to map the parsed data to application content, determining, based at least in part on the application content, a navigation path for transitioning from a current configuration state to the desired end-state configuration, and generating and presenting user guidance data including cues, prompts, or the like for transitioning through the navigation path. These aspects of the disclosure constitute technical features that yield the technical effect of being able to automate the process of generating user guidance for establishing a desired end-state configuration by identifying the desired end-state configuration directly from source data and automatically determining the navigation path (e.g., the series of user actions) for transitioning from the current configuration state to the desired end-state configuration. The user guidance data may include prompts, cues, or the like that direct the end user in real-time through the series of user actions necessary to establish the desired end-state configuration. This yields a technical effect of ensuring that the end user's actions correctly correspond to the selected navigation path. In addition, example embodiments of the disclosure also provide for automatically performing one or more modifications to transition between configuration states as the navigation path is traversed. This provides the technical effects of reducing the burden on the user to perform the configuration change and reducing human error. As a result of these technical features and technical effects, example embodiments of the disclosure represent an improvement to existing application configuration technology. It should be appreciated that the above examples of technical features, technical effects, and improvements to other technological fields provided by example embodiments of the disclosure are merely illustrative and not exhaustive.

Figure 3:
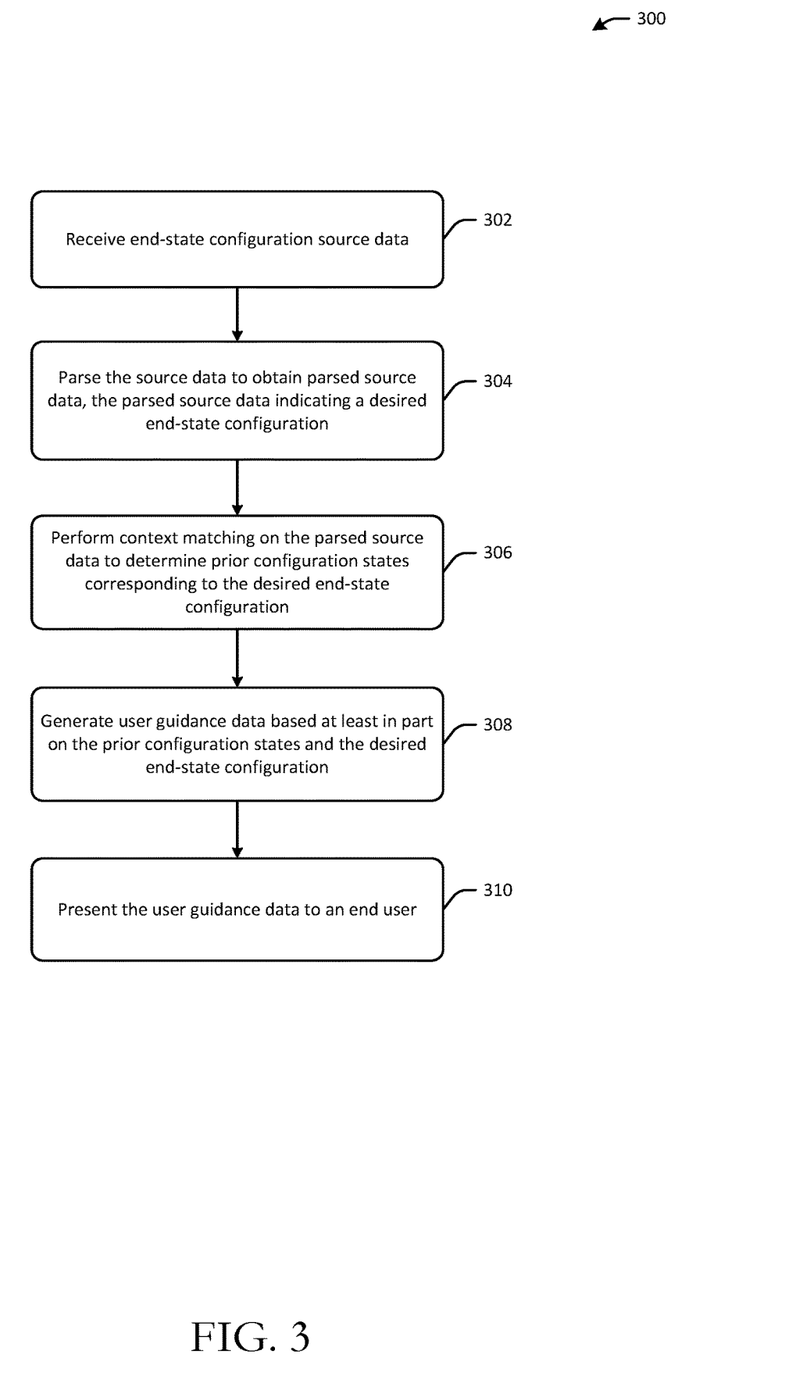
FIG. 3 is a process flow diagram of an illustrative method for determining and presenting, to an end user, user guidance data that enables establishing a desired end-state configuration in accordance with one or more example embodiments of the disclosure.

FIG. 3 is a process flow diagram of an illustrative method 300 for determining user guidance data for achieving a desired end-state configuration of an application from a current configuration state of the application in accordance with one or more example embodiments of the disclosure.

At block 302, the application component 106 may receive the end-state configuration source data 104 from the end user 102. As previously described, the end-state configuration source data 104 may relate to an application that the end user 102 wishes to configure and may include one or more images 104A, video content 104B, text file(s) 104C, or the like. The end-state configuration source data 104 may be provided to the application component 106 in any of a variety of ways. For example, the end-state configuration source data 104 may be uploaded to the application component 106 via a drag-and-drop mechanism or via any other suitable upload mechanism. In certain example embodiments, a screenshot of an application window representing a desired end-state configuration may be generated and dragged onto a UI of the application component 106.

Upon receiving the end-state configuration source data 104, the application component 106 may initiate an investigation phase to parse the end-state configuration source data 104 at block 304. In particular, computer-executable instructions of the parser 106B may be executed to cause the source data 104 to be parsed at block 304. Parsing the source data may result in parsed data that includes an indication of the desired end-state configuration 108C. The parser 106B may provide the parsed data including the indication of the desired end-state configuration 108C to the application component 106.

At block 306, one or more context matching operations may be performed on the parsed data to match portions of the parsed data to applicable content of the application to be configured. More specifically, the application component 106 may send a request or otherwise instruct the context matching module(s) 106C to perform context matching operations to match the parsed data to application content (e.g., application window(s)) of the application, and as a result, identify prior (e.g., intermediate) configuration states 108B corresponding to the desired end-state configuration 108C. In certain example embodiments, once the context matching module(s) 106C have performed a context matching operation to determine application content (e.g., an application window) that corresponds to the end-state configuration 108C, the context matching module(s) 106C, or more generally, the investigation module(s) 106A may access a hierarchal tree or other data construct that includes a plurality of navigation paths in order to determine a navigation path for achieving the desired end-state configuration 108C. More specifically, the context matching module(s) 106C may be configured to determine a current configuration state 108A of an application and locate the navigation path in the hierarchal tree that represents the appropriate path for transitioning from the current configuration state 108A to the desired end-state configuration 108C by traversing through one or more intermediate configuration states 108B.

After the context matching module(s) 106C are executed to determine a navigation path for transitioning from the current configuration state 108A of an application to the desired end-state configuration 108C, the context matching module(s) 106C may provide an indication of the selected navigation path to the application component 106 which may, in turn, send a request to the user guidance module(s) 106D to generate corresponding user guidance data 108 based at least in part on the selected navigation path. At block 308, the user guidance module(s) 106D may generate the user guidance data 108 based at least in part on the navigation path (e.g., the current configuration state 108A, the intermediate configuration states 108B, and the end-state configuration 108C).

Upon generating the user guidance data 108, the user guidance module(s) 106D may send the user guidance data 108 to the application component 106 which may, in turn, at block 310, initiate presentation of the user guidance data 108 to the end user 102 in any suitable form. The user guidance data 108 may be, for example, a series of slides that may include images, text, or the like that guide the end user 102 through the process of transitioning from the current configuration state 108A of the application to the desired end-state configuration 108C. As another example, the user guidance data 108 may include verbal and/or visual cues that sequentially direct the end user 102 to appropriate areas in the application to make the necessary modifications to various settings to achieve the desired end-state configuration 108C.

Figure 4:
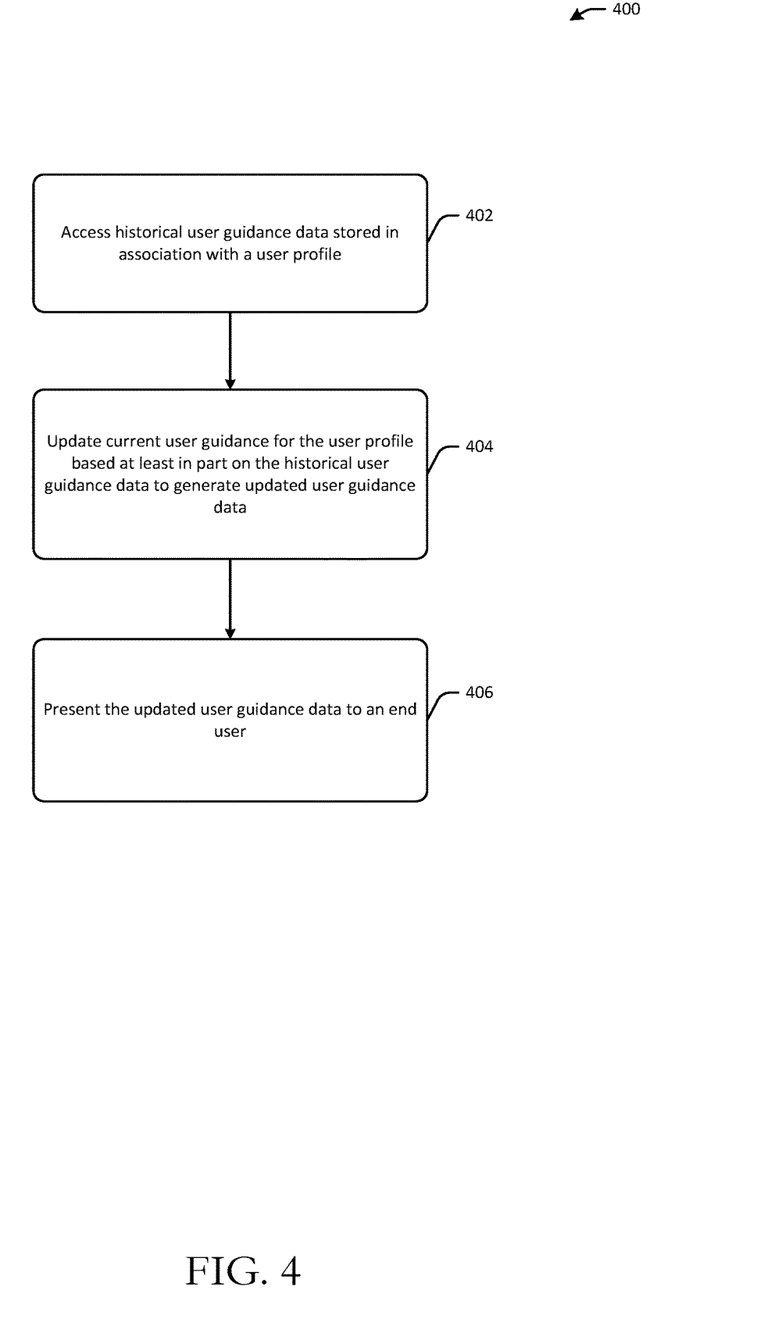
FIG. 4 is a process flow diagram of an illustrative method for updating user guidance data based at least in part on historical user guidance data in accordance with one or more example embodiments of the disclosure.

FIG. 4 is a process flow diagram of an illustrative method 400 for updating user guidance data based at least in part on historical user guidance data in accordance with one or more example embodiments of the disclosure.

At block 402, the user guidance module(s) 106D may access stored historical user guidance data indicating the nature of the user guidance previously presented to the end user 102 (e.g., the number and/or type of cues presented), the number of instances such user guidance was presented to the end user 102, and so forth. In particular, when a request is received indicating a desired end-state configuration (e.g., the end-state configuration 108C) and prior to presenting the user guidance data (e.g., the user guidance data 108) for achieving the desired end-state configuration, the user guidance module(s) 106D may access the historical user guidance data to determine whether user guidance data was previously presented to the same user profile to achieve the same desired end-state configuration, and if so, the nature of such user guidance.

If, for example, user guidance was previously presented for achieving the same end-state configuration that is currently desired, the current user guidance data may be modified at block 404 based on an assumption that the end user 102 possesses some prior knowledge as to how to achieve the desired end-state configuration 108C. For example, verbal and/or visual cues previously presented for achieving the desired end-state configuration 108C may be modified to arrows or other simpler prompts directing the end user 102 through the intermediate application windows specified by the selected navigation path and representative of the intermediate configuration states 108B. The user guidance module(s) 106D may then provide the updated user guidance data to the application component which may, in turn, present the updated user guidance data to the end user 102.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Illustrative Computer Architecture

Figure 5:
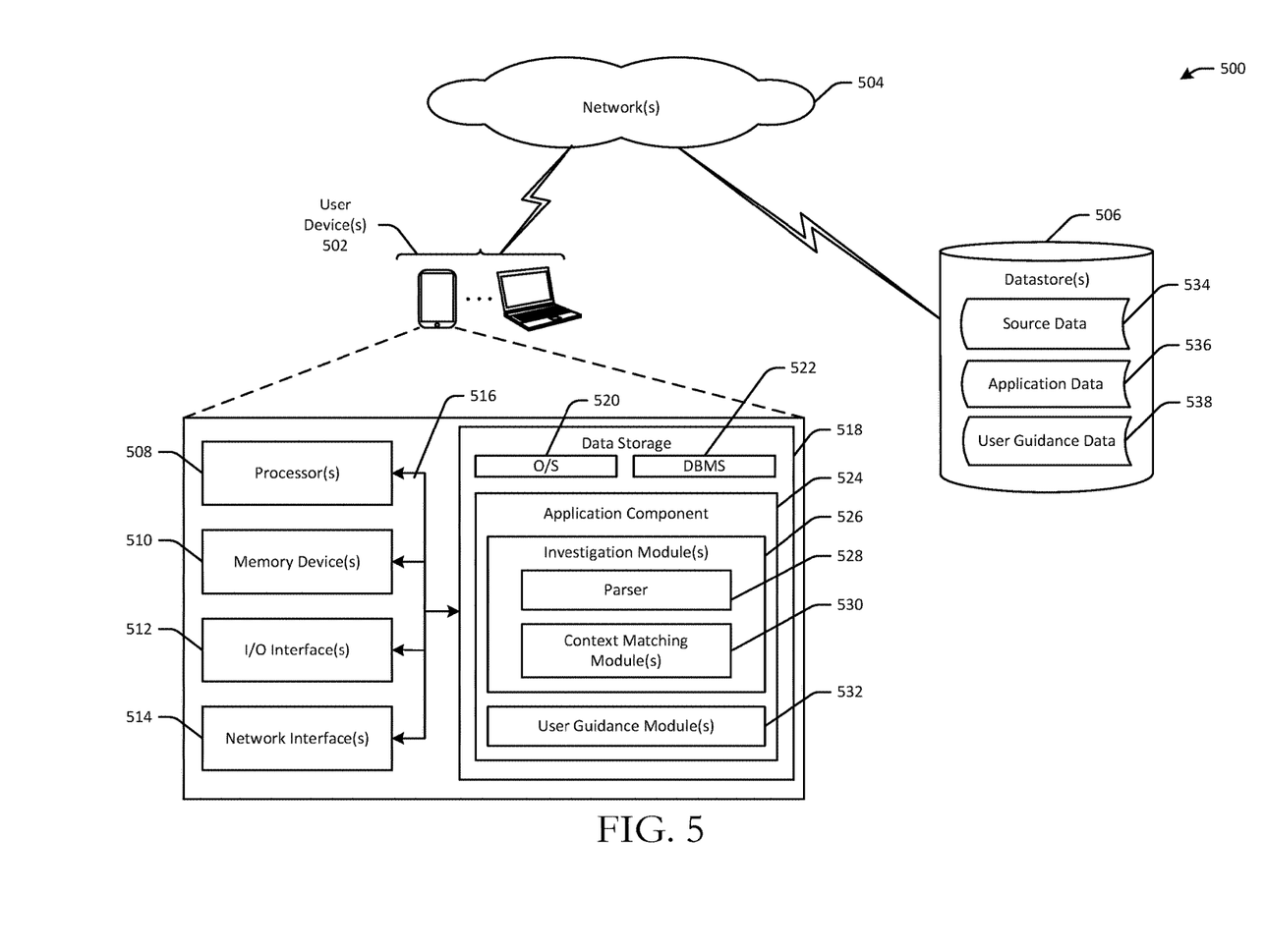
FIG. 5 is a schematic diagram of an illustrative computer architecture in accordance with one or more example embodiments of the disclosure.

FIG. 5 is a schematic diagram of an illustrative computer architecture 500 in accordance with one or more example embodiments of the disclosure. The architecture 500 may include one or more user devices 502 configured to access one or more datastores 506 over one or more networks 504. While the datastore(s) 506 are depicted as network-accessible datastore(s), it should be appreciated that any data depicted or described as being stored in the datastore(s) 506 may instead be stored locally on the user device(s). Further, while not shown in FIG. 5, the user device(s) may be configured to communicate with other devices (e.g., one or more back-end servers) via the network(s) 504. In addition, while the user device(s) 502 may be described herein in the singular, it should be appreciated that multiple user devices 502 may be provided. Further, any functionality described in connection with the user device 502 may be distributed across the user device 502 and another device with which the user device is configured to communicate (e.g., a back-end server accessible over the network(s) 504).

In an illustrative configuration, the user device 502 may include one or more processors (processor(s)) 508, one or more memory devices 510 (generically referred to herein as memory 510), one or more input/output ("I/O") interface(s) 512, one or more network interfaces 514, and data storage 518. The user device 502 may further include one or more buses 516 that functionally couple various components of the user device 502. Further, while not shown in FIG. 5, the user device 502 may further include one or more sensors (e.g., an inertial sensor), one or more radios and one or more antennas for transmitting and receiving data across a network in accordance with any suitable transmission protocol, and so forth.

The bus(es) 516 may include at least one of a system bus, a memory bus, an address bus, or a message bus, and may permit the exchange of information (e.g., data (including computer-executable code), signaling, etc.) between various components of the user device 502. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 of the user device 502 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 510 and the data storage 518, removable and/or non-removable, are examples of computer-readable storage media (CRSM) as that term is used herein.

The data storage 518 may store computer-executable code, instructions, or the like that may be loadable into the memory 510 and executable by the processor(s) 508 to cause the processor(s) 508 to perform or initiate various operations. The data storage 518 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510, and may ultimately be copied to data storage 518 for non-volatile storage.

More specifically, the data storage 518 may store one or more operating systems (OS) 520; one or more database management systems (DBMS) 522 configured to access the memory 510 and/or the datastore(s) 506; and one or more program modules, applications, engines, computer-executable code, scripts, or the like such as, for example, an application component 524 that includes one or more investigation modules 526 and one or more user guidance modules 532. Any of the program modules or the like may include one or more sub-modules or the like. For example, the investigation module(s) 526 may include a parser 528 and one or context matching modules 530. Any of the components depicted as being stored in data storage 518 may include any combination of software, firmware, and/or hardware. The software and/or firmware may include computer-executable code, instructions, or the like that may be loaded into the memory 510 for execution by one or more of the processor(s) 508 to perform any of the operations described earlier in connection with correspondingly named engines or modules.

Although not depicted in FIG. 5, the data storage 518 may further store various types of data utilized by components of the user device 502 (e.g., any of the data depicted as being stored in the datastore(s) 506). Any data stored in the data storage 518 may be loaded into the memory 510 for use by the processor(s) 508 in executing computer-executable code. In addition, any data stored in the data storage 518 may potentially be stored in the datastore(s) 506 and may be accessed via the DBMS 522 and loaded in the memory 510 for use by the processor(s) 508 in executing computer-executable instructions, code, or the like.

The processor(s) 508 may be configured to access the memory 510 and execute computer-executable instructions loaded therein. For example, the processor(s) 508 may be configured to execute computer-executable instructions of the various program modules, applications, engines, or the like of the user device 502 to cause or facilitate various operations to be performed in accordance with one or more embodiments of the disclosure. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 518, the OS 520 may be loaded from the data storage 518 into the memory 510 and may provide an interface between other application software executing on the user device 502 and hardware resources of the user device 502. More specifically, the OS 520 may include a set of computer-executable instructions for managing hardware resources of the user device 502 and for providing common services to other application programs (e.g., managing memory allocation among various application programs). In certain example embodiments, the OS 520 may control execution of one or more of the program modules depicted as being stored in the data storage 518. The OS 520 may include any operating system now known or which may be developed in the future including, but not limited to, any server operating system, any mainframe operating system, or any other proprietary or non-proprietary operating system.

The DBMS 522 may be loaded into the memory 510 and may support functionality for accessing, retrieving, storing, and/or manipulating data stored in the memory 510, data stored in the data storage 518, and/or data stored in the datastore(s) 506. The DBMS 522 may use any of a variety of database models (e.g., relational model, object model, etc.) and may support any of a variety of query languages. The DBMS 522 may access data represented in one or more data schemas and stored in any suitable data repository.

The datastore(s) 506 may include, but are not limited to, databases (e.g., relational, object-oriented, etc.), file systems, flat files, distributed datastores in which data is stored on more than one node of a computer network, peer-to-peer network datastores, or the like. The datastore(s) 506 may store various types of data including, without limitation, source data 534 (e.g., the end-state configuration source data 104); application data 536 (e.g., application content, navigation path trees, etc.); and user guidance data 538 (e.g., the user guidance data 108). It should be appreciated that in certain example embodiments, any of the datastore(s) 506 and/or any of the data depicted as residing thereon may additionally, or alternatively, be stored locally in the data storage 518.

Referring now to other illustrative components of the user device 502, the input/output (I/O) interface(s) 512 may facilitate the receipt of input information by the user device 502 from one or more I/O devices as well as the output of information from the user device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the user device 502 or may be separate. The I/O devices may further include, for example, any number of peripheral devices such as data storage devices, printing devices, and so forth.

The I/O interface(s) 512 may also include an interface for an external peripheral device connection such as universal serial bus (USB), FireWire, Thunderbolt, Ethernet port or other connection protocol that may connect to one or more networks. The I/O interface(s) 512 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 502 may further include one or more network interfaces 514 via which the user device 502 may communicate with any of a variety of other systems, platforms, networks, devices, and so forth. The network interface(s) 514 may enable communication, for example, with one or more other devices (e.g., another user device 502, a back-end server, etc.) via one or more of the network(s) 504 which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 504 may have any suitable communication range associated therewith and may include, for example, global networks (e.g., the Internet), metropolitan area networks (MANs), wide area networks (WANs), local area networks (LANs), or personal area networks (PANs). In addition, the network(s) 406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the applications/modules depicted in FIG. 5 as being stored in the data storage 518 (or depicted in FIG. 1) are merely illustrative and not exhaustive and that processing described as being supported by any particular module may alternatively be distributed across multiple modules, sub-modules, engines, or the like, or performed by a different module, sub-module, engine, or the like. In addition, various program module(s), script(s), plug-in(s), Application Programming Interface(s) (API(s)), or any other suitable computer-executable code hosted locally on the user device 502 and/or hosted on other computing device(s) accessible via one or more of networks, may be provided to support functionality provided by the modules depicted in FIGS. 1 and 5 and/or additional or alternate functionality. Further, functionality may be modularized differently such that processing described as being supported collectively by the collection of modules depicted in FIGS. 1 and 5 may be performed by a fewer or greater number of program modules, or functionality described as being supported by any particular module may be supported, at least in part, by another program module. In addition, program modules that support the functionality described herein may form part of one or more applications executable across any number of devices of the architecture 500 in accordance with any suitable computing model such as, for example, a client-server model, a peer-to-peer model, and so forth. In addition, any of the functionality described as being supported by any of the modules depicted in FIGS. 1 and 5 may be implemented, at least partially, in hardware and/or firmware across any number of devices.

It should further be appreciated that the user device 502 may include alternate and/or additional hardware, software, or firmware components beyond those described or depicted without departing from the scope of the disclosure. More particularly, it should be appreciated that software, firmware, or hardware components depicted as forming part of the user device 502 are merely illustrative and that some components may not be present or additional components may be provided in various embodiments. While various illustrative modules have been depicted and described as software modules stored in data storage 518, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted or described as sub-modules of another module, in certain embodiments, such modules may be provided as independent modules or as sub-modules of other modules.

One or more operations of the methods 300 or 400 may be performed by a user device 502 having the illustrative configuration depicted in FIG. 5, or more specifically, by one or more program modules, applications, engines, or the like executable on such a user device 502. It should be appreciated, however, that such operations may be implemented in connection with numerous other system configurations.

The operations described and depicted in the illustrative methods of FIGS. 3 and 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for generating user guidance data for achieving a desired end-state configuration, the system comprising:
    at least one memory storing computer-executable instructions; and
    at least one processor configured to access the at least one memory and execute the computer-executable instructions to:
        receive, from an end user, input data;
        parse the input data to obtain parsed data, the parsed data indicating the desired end-state configuration of an application;
        determine, based at least in part on the parsed data, a set of one or more intermediate configuration states between a current configuration state of the application and the desired end-state configuration;
        generate user guidance data based at least in part on the current configuration state, the set of one or more intermediate configuration states, and the desired end-state configuration; and
        present the user guidance data to the end user, wherein presenting the user guidance data to the end user comprises causing the application to transition automatically between at least two configuration states without requiring input from the end user to cause the transition.

2. The system of claim 1, wherein the input data comprises an image of an application window representing the desired end-state configuration.

3. The system of claim 1, wherein the input data comprises a series of images, and wherein the at least one processor is configured to parse the input data by executing the computer-executable instructions to determine an ordering of the series of images.

4. The system of claim 1, wherein the at least one processor is configured to determine the set of one or more intermediate configuration states by executing the computer-executable instructions to:
    determine a set of navigation paths, wherein each navigation path corresponds to a respective pair of application windows comprising an initial application window and a final application window, and wherein each navigation path identifies a respective set of one or more intermediate application windows to navigate through to arrive at the final application window from the initial application window;
    determine a first application window corresponding to the current configuration state and a second application window corresponding to the desired end-state configuration; and
    determine a particular navigation path in the set of navigation paths that corresponds to the first application window and the second application window, wherein the respective set of one or more intermediate application windows identified by the particular navigation path is representative of the set of one or more intermediate configuration states.

5. The system of claim 1, wherein the at least one processor is configured to present the user guidance data to the end user by executing the computer-executable instructions to present one or more verbal or visual cues indicative of the set of one or more intermediate configuration states.

6. The system of claim 1, wherein the at least one processor is further configured to execute the computer-executable instructions to:
    determine a user profile corresponding to the end user;
    access historical user guidance data stored in association with the user profile;
    modify the user guidance data based at least in part on the historical user guidance data; and
    present the modified user guidance data to the end user.

7. The system of claim 1, wherein the at least one processor is configured to present the user guidance data to the end user by executing the computer-executable instructions to automate a transition from a first configuration state to a second configuration state, wherein the first configuration state corresponds to the current configuration state or a first intermediate configuration state and the second configuration state corresponds to a second intermediate configuration state or the desired end-state configuration.

8. A computer program product for generating user guidance data for achieving a desired end-state configuration, the computer program product comprising a non-transitory storage medium readable by a processing circuit, the storage medium storing instructions executable by the processing circuit to cause a method to be performed, the method comprising:
    receiving, from an end user, input data;
    parsing the input data to obtain parsed data, the parsed data indicating a desired end-state configuration of an application;
    determining, based at least in part on the parsed data, a set of one or more intermediate configuration states between a current configuration state of the application and the desired end-state configuration;

generating user guidance data based at least in part on the current configuration state, the set of one or more intermediate configuration states, and the desired end-state configuration; and presenting the user guidance data to the end user, wherein presenting the user guidance data to the end user comprises causing the application to transition automatically between at least two configuration states without requiring input from the end user to cause the transition.

9. The computer program product of claim 8, wherein the input data comprises an image of an application window representing the desired end-state configuration.

10. The computer program product of claim 8, wherein the input data comprises a series of images, and wherein parsing the input data comprises determining an ordering of the series of images.

11. The computer program product of claim 8, wherein determining the set of one or more intermediate configuration states comprises:

determining a set of navigation paths, wherein each navigation path corresponds to a respective pair of application windows comprising an initial application window and a final application window, and wherein each navigation path identifies a respective set of one or more intermediate application windows to navigate through to arrive at the final application window from the initial application window;

determining a first application window corresponding to the current configuration state and a second application window corresponding to the desired end-state configuration; and determining a particular navigation path in the set of navigation paths that corresponds to the first application window and the second application window, wherein the respective set of one or more intermediate application windows identified by the particular navigation path is representative of the set of one or more intermediate configuration states.

12. The computer program product of claim 8, wherein presenting the user guidance data to the end user comprises presenting one or more verbal or visual cues indicative of the set of one or more intermediate configuration states.

13. The computer program product of claim 8, the method further comprising:

determining a user profile corresponding to the end user;

accessing historical user guidance data stored in association with the user profile;

modifying the user guidance data based at least in part on the historical user guidance data; and presenting the modified user guidance data to the end user.

* * * * *